(12) United States Patent
Palma et al.

(10) Patent No.: US 9,970,791 B2
(45) Date of Patent: May 15, 2018

(54) INSTALLATION ASSEMBLY FOR A THERMOMETER

(71) Applicant: Endress + Hauser Wetzer GmbH + Co. KG, Nesselwang (DE)

(72) Inventors: Luca Palma, Zibido San Giaco (IT); Helena Furgut, Kempten (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 153 days.

(21) Appl. No.: 14/548,644

(22) Filed: Nov. 20, 2014

(65) Prior Publication Data

US 2015/0143931 A1 May 28, 2015

(30) Foreign Application Priority Data

Nov. 27, 2013 (EM) .................................... 13194626

(51) Int. Cl.
*G01K 1/14* (2006.01)
*G01D 11/30* (2006.01)

(52) U.S. Cl.
CPC ............... *G01D 11/30* (2013.01); *G01K 1/14* (2013.01)

(58) Field of Classification Search
CPC ........ G01K 1/14; G01D 11/24; G01D 11/245; G01D 11/30; F16D 3/38; F16D 3/382; F16D 3/40; F16D 3/845; C21B 7/24
See application file for complete search history.

(56) References Cited

U.S. PATENT DOCUMENTS

| 3,425,504 | A | * | 2/1969 | Hass ...................... B62D 1/163 180/78 |
| 4,054,060 | A | | 10/1977 | Ueno |
| 4,218,918 | A | | 8/1980 | Ueno |
| 4,393,703 | A | * | 7/1983 | Schneider ................. C21B 7/24 73/863.85 |
| 5,452,618 | A | * | 9/1995 | Bulow ..................... G01N 7/02 73/863.82 |
| 7,807,097 | B1 | * | 10/2010 | Tucker ..................... C22C 1/08 164/79 |

OTHER PUBLICATIONS

European Search Report, EPO, Munich, dated Jul. 21, 2014.

* cited by examiner

*Primary Examiner* — Justin Olamit

(74) *Attorney, Agent, or Firm* — Bacon & Thomas, PLLC

(57) ABSTRACT

An installation assembly for connecting a probe element to a wall of a container, comprising: a first mounting part and a second mounting part, wherein the first mounting part serves for attaching the assembly to the container wall and has a lead-through through which the probe element is insertable. The second mounting part serves for receiving and fastening the probe element, and the first and the second mounting part are flexibly connected to each other.

12 Claims, 3 Drawing Sheets

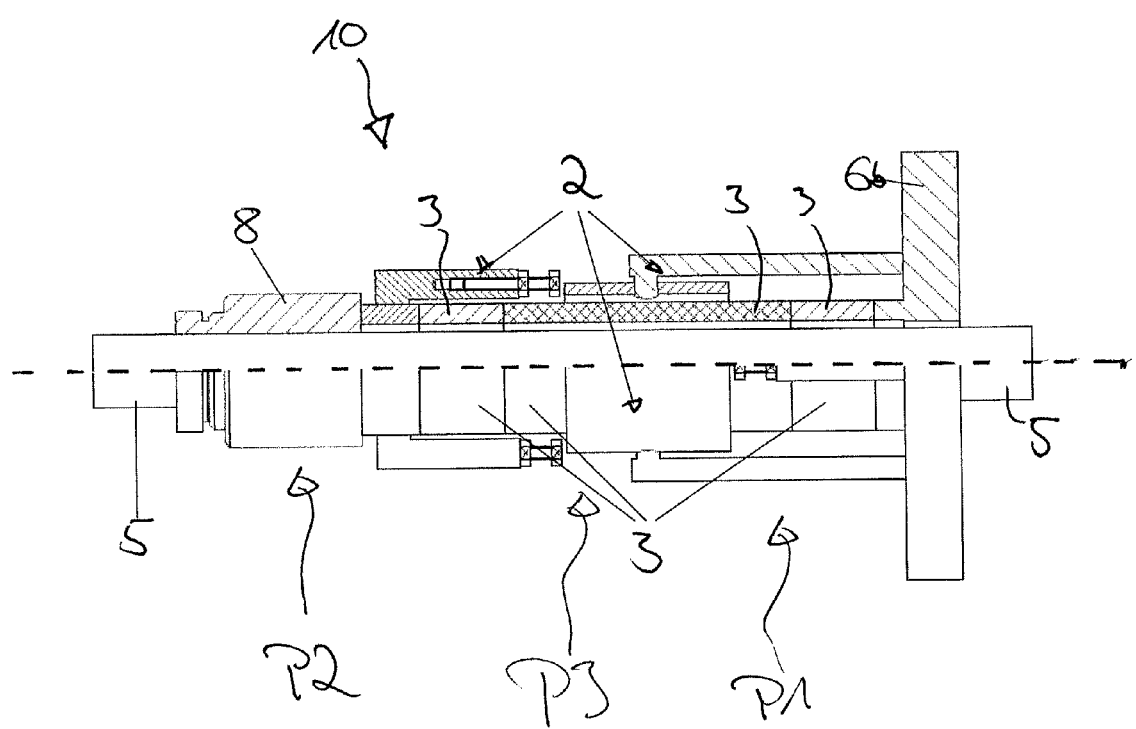

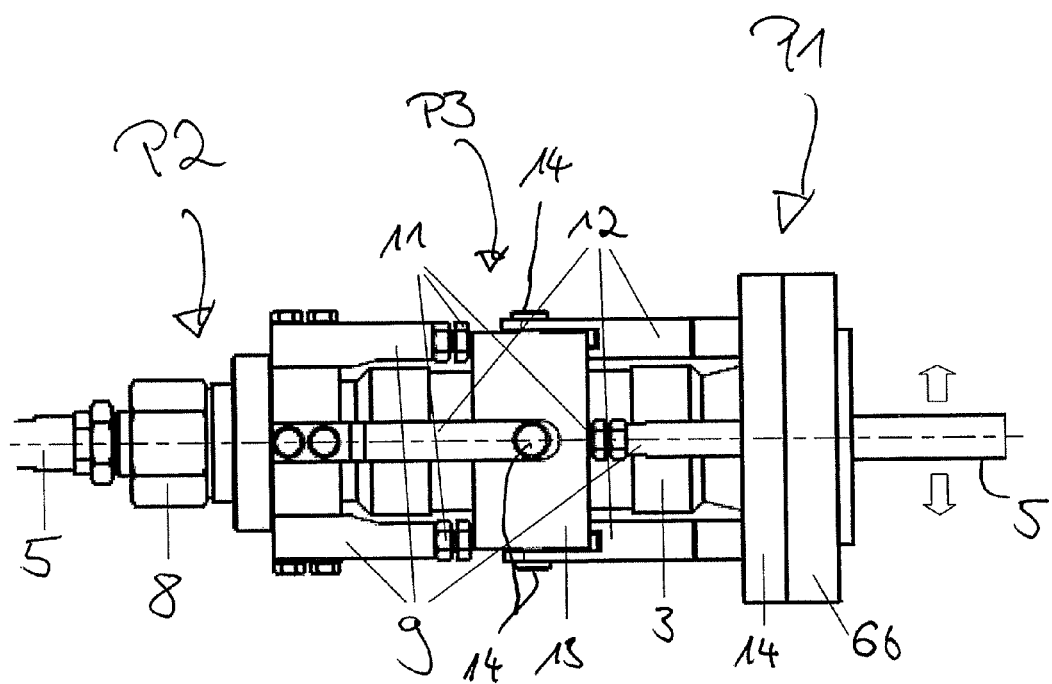

INSTALLATION ASSEMBLY FOR A THERMOMETER

TECHNICAL FIELD

Background Discussion

Such an installation assembly is used to connect a sensor, e.g. thermometer, to a wall of a container. By way of the assembly the thermometer, usually comprising a head part, is connected to the outside wall of the container, in which container a process medium is present. In order to measure the temperature a measuring insert may be used which is inserted into a thermowell. The thermowell itself is immersed into the process medium. Hence the measuring insert, typically comprising e.g. a thermocouple or a temperature dependent resistance, is thermally coupled to the process medium but however protected from the medium by the thermowell. Such an assembly is e.g. shown in the German patent publication DD 275171 A3.

The present invention concerns an installation assembly, preferably for a thermometer, and an arrangement comprising the installation assembly.

Such an installation assembly is used to connect a sensor, e.g. thermometer, to a wall of a container. By way of the assembly the thermometer, usually comprising a head part, is connected to the outside wall of the container, in which container a process medium is present. In order to measure the temperature a measuring insert may be used which is inserted into a thermowell. The thermowell itself is immersed into the process medium. Hence the measuring insert, typically comprising e.g. a thermocouple or a temperature dependent resistance, is thermally coupled to the process medium but however protected from the medium by the thermowell. Such an assembly is e.g. shown in the patent publication DD 275171 A3.

A typical container like a reactor is provided with several openings, called nozzles, that allow the inlet of measuring probes or sensors for controlling different parameters of the process that takes place inside: level, flow, temperature, pressure, etc. Some of these probes may go directly in contact with process fluid, so they have to cross the wall of the container.

During working conditions of the reactor, due to thermal effects and temperature gradients, e.g. different layers constitute the walls of the reactor can move or shift and can come into contact with the probes that cross the wall, thus inducing unforeseen loads and stresses on them. The layers are made of different materials. Especially when a probe is made of a ceramic material, these extra-loads can cause the rupture of the external sheaths or of the whole sensor itself. For example, typical high temperature reactors (e.g. gasifiers and sulphur recovery units in Oil&Gas Industries) are constituted by up to three lines of refractory bricks that protect the external shell of the container from heat coming from the process reactions. Often, refractory bricks are just leaned on structures present in the reactors; during working conditions the different lines of bricks can shift and move in different ways and with different extensions.

When the temperature inside the reactor is very high, for example above 1000° C., ceramic sheaths are needed to build at least the part of the sensor/probe inside the reactor. The shifting bricks can break these ceramic sheaths. Nevertheless, the present invention can be applied for every kind of material the probe is constituted by and to every kind of process reactor.

So, differential deformations between process environments and process connection are very critical issues for the reliability of probes and sensors, for example they can facilitate the inlet of aggressive agents (gas or liquid) and cause drift or loss of a measuring point. From field experience, it results that even the installation is a very critical step, because all the data needed to properly design all the components of a measuring device are not always available. Thus, the compensation system should be as much applicable as possible to different applications where the same criticalities can occur.

SUMMARY OF THE INVENTION

Hence a problem addressed by the present invention is to provide a compensation for the above mentioned wall movement and trouble when installing such a thermometer.

The problem is solved by an installation assembly and an arrangement comprising an aforementioned installation assembly and a probe element and a container.

Regarding the installation assembly the problem is solved by an installation assembly for connecting a probe element to a wall of a container comprising: a first mounting part and a second mounting part, wherein the first mounting part serves for attaching the assembly to the container wall and has a lead-through through which the probe element is insertable, wherein the second mounting part serves for receiving and fastening the probe element, wherein the first and the second mounting part are flexibly connected to each other.

The present invention provides an arrangement which is able to connect to the process and extend the working life of a measuring probe or sensor, which measuring probe or sensor that has to be inserted into a container, i.e. a reactor or a vessel, where there is relative displacement between process connection and measuring environment due to thermal effects. The main system described in this invention is a flexible process connection that enables a probe or a sensor (for measuring temperature, level, pressure, flow, etc . . . ) to follow, within certain limits, the movement of the wall of a reactor. This movement is quite always present during working condition of the container and can be very dangerous for the sensor itself, as the materials which constitute the wall (for example refractory bricks) can damage the probe.

Hence by way of the present invention this problem is overcome by allowing small angular movements at the upper part of the probe. In this invention, this is realized by a flexible system between process connection (e.g. flanged nozzle) and the probe. The flexible system is composed by a flexible e.g. metal hose welded to a flange. The gas tightness of the connection is reached by the means of a compression fitting that is connected to the flexible hose and seals onto the probe.

The flexible process connection is provided e.g. with a cardan joint both to restrict the movement and to sustain load in case of high pressure applications.

In an embodiment of the installation assembly the installation assembly further comprises a joint part, wherein the first and the second mounting part are connected to each other via a joint part.

In an embodiment of the installation assembly the joint part comprises a flexible hose, which one end is fixed to the first mounting part and which second end is fixed to the second mounting part.

In an embodiment of the installation assembly the probe element is insertable into the flexible hose.

In an embodiment of the installation assembly the hose is a corrugated tube made of metal.

In an embodiment of the installation assembly the installation assembly the joint part comprises the flexible hose and a cardan joint connecting the first and the second mounting part.

In an embodiment of the installation assembly the joint part forming the cardan joint comprises a ring, through which the probe element is insertable, wherein the ring has a first and a second pair of axle stubs, wherein the first mounting part has two fork like arms for connecting the first mounting part to the ring via a first pair of axle stubs, wherein the second mounting part has two fork like arms for connecting the second mounting part to the ring via a second pair of axle stubs.

In an embodiment of the installation assembly the first mounting part and/or the second mounting part has at least one adjustable abutment, which serves for limiting the amplitude of the movement of the ring.

This compensation system serves for purposes: leaving a certain degree of freedom to the probe's tip, but at the same time restricting its movement within predetermined limits. Moreover, referring to the installation issues encountered, the system should facilitate the entry and alignment of the probe through the walls of the container. All these problems may be overcome through the use of the flexible process connection, especially with a cardan joint, as described in the present invention.

In an embodiment of the installation assembly the second mounting part comprises a gas tight barrier, e.g. compression fitting for sealing a lead-through for the probe element or a welding for sealing a lead-through for the probe element.

In an embodiment of the installation assembly the probe element is moveably attached to the container wall by way of the installation assembly.

In an embodiment of the installation assembly the installation assembly serves for inserting the probe into the container, and wherein the probe element is a temperature sensor, a level sensor, a pressure sensor, a flow sensor.

In an embodiment of the installation assembly serves for inserting the probe into the container and wherein the probe element is a thermowell.

In an embodiment of the installation assembly the probe element is a measuring insert which is inserted in a thermowell.

In an embodiment of the installation assembly the installation assembly the installation assembly provides a gas-tight connection of the probe element to a process medium in the container.

In an embodiment of the installation assembly the installation assembly the probe is inserted in the installation assembly through the compression fitting.

Regarding the arrangement the problem is solved by an arrangement comprising an installation assembly and a probe and a container as described in the aforementioned embodiments.

And of course the assembly can be part of a pre-assembled thermometer.

BRIEF DESCRIPTION OF THE DRAWINGS

The invention is described in further detail in the following drawings:

FIG. 2: is a partial perspective and partial cross sectional view of the assembly mounted on a probe element; and FIG. 3: is a perspective view of the assembly, comprising a joint part connecting the first and the second mounting part.

DETAILED DISCUSSION IN CONJUNCTION WITH THE DRAWINGS

Figure 1:
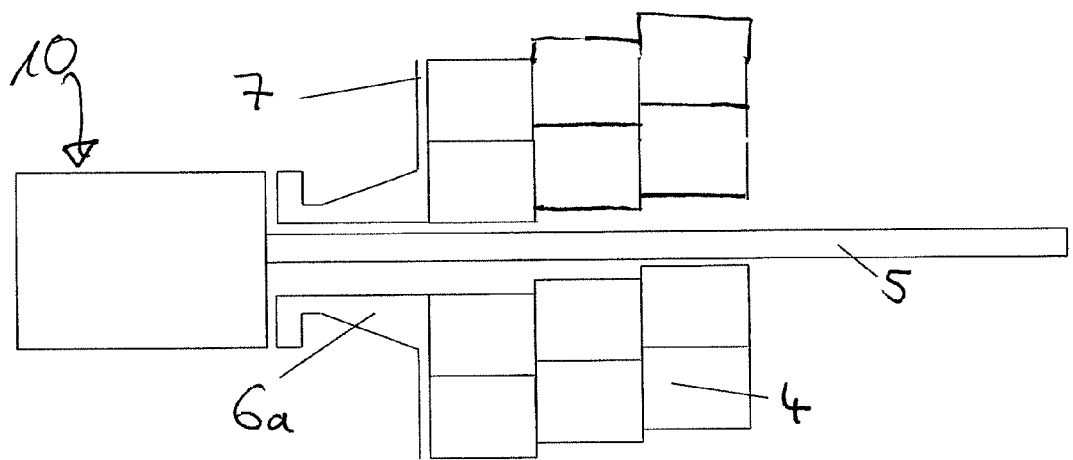
FIG. 1: is a sketch of a thermometer attached to a wall of a container.

The embodiments as described in the above and as shown in the figures show an assembly 10 or arrangement respectively that serves as a connection and protection system for a probe element 5, e.g. a protective tube, also known as a thermowell, or a measuring insert, which are inserted into a container, like a reactor or a vessel, where thermal gradients between process connection and measuring environment are present. Accordingly, the probe element 5 is inserted in a nozzle in the wall 4 of a container. The inserted probe hence comes in contact with the process on the one side of the wall 4. The probe element may be an arbitrary body, though preferably cylindrical, that is to be immersed into a medium.

The assembly 10 is attached to a process connection 6a which itself is connected to the outside of the wall 4 of the container. The outside 7 of the wall 4 can at least in the region of the process connection 6a be made out of metal.

The assembly 10 serves as a flexible process connection that enables a probe element, e.g. a sensor (for measuring temperature, level, pressure, flow, etc . . . ), to follow the movement of the wall 4 of the container within certain limits. This movement is quite always present during working condition of the container and can be very dangerous for the probe element 5. The easiest way to give the probe element 5 the freedom to follow this displacement is to allow small angular movements at the upper part of the probe—depicted by arrows in FIG. 3.

The whole assembly 10 or part(s) of it may be employed in cases where it is requested that a body, like a probe element 5, goes through a non-static wall 4 or whatever generates relative displacement e.g. due to thermal effects between process connection 6 and measuring environment. The movement of the wall 4 of the container is depicted by the displacement of the bricks of the wall 4. The originally aligned bricks are now, as shown in FIG. 1, misaligned. Therefore the nozzle opening towards the inside of the container is straight no more.

The assembly 10 is thus a system to compensate movements and it is characterized by e.g. the following features: it enables the probe 5 to be connected to process connection (e.g. flanged nozzle, but also other types of connections); ensures gas tightness from process gases; enables the probe 5 to make limited movements to follow the shifting wall. This allows a longer working life of the probe element 5.

Also the assembly 10 as proposed reduces maintenance costs. This is achieved by going in the opposite way recent development in the present technical field does, i.e. by way of making more and more rigid systems to sustain loads coming e.g. from refractory bricks.

FIG. 2 and FIG. 3 show the installation assembly 10 in more detail, wherein FIG. 2 provides a partly cross sectional view and FIG. 3 a perspective view on the assembly proposed: The assembly 10 proposed may according to these examples comprise the following components:

I) A flexible hose 3, which ends are connected (e.g. welded) to a flange 6 on one side and to a compression fitting 8 on the other side. Instead of the compression fitting the hose 3 can be fixed by way of any other suitable connection. The flexible hose 3 is made of, for example, a corrugated flexible metallic hose for high pressure with e.g. close pitch annular corrugations, obtained for example by hydroforming. Any kind of flexible hose 3 may be used as well. The flexible hose 3 features (material, pressure rating, etc. . . . ) can be chosen suitably related to a specific applications.

II) A cardan joint 2, i.e. a mechanical joint realized by different sub-components. Generally, a cardan joint (known in mechanics with different names: universal joint, universal coupling, U-joint, Hardy-Spicer joint, or Hooke's joint) is a joint or coupling in a rigid rod that allows the rod to 'bend' in any direction, and is commonly used in shafts that transmit rotary motion. It may consist of a pair of hinges located close together, oriented at 90° to each other, connected by a cross shaft or a ring 13. In the present invention, a cardan joint is realized through one ring 13, four "arms" 12, four bumpers 9, bolts and nuts 11. The ring 13 has a first and a second pair of axle stubs 14. This kind of joint 2 is able to carry the weight of the thermometer and restricts also the movement by giving it only a certain degree of freedom.

The arms 12 give the mechanical support to the system. On the other side, by adjusting the position of bolts and nuts 11 it is possible to limit the lateral oscillation of the ring 13 (defining the gap between bumpers and ring), thus regulating the maximum movements of the probe 5 in a tailored way.

The joint part P3 of FIG. 2 hence may comprise or consist of the cardan joint 2 and the flexible hose 3.

III) A compression fitting 8 for the probe element 5, can be a thermowell or measuring insert (of cylindricalshape, typically). The probe element 5 and the measuring insert respectively are inserted in the flexible process connection assembly 10 through the compression fitting 8. The compression fitting 8 is a very common component in mechanics which is used to provide gas tightness when joining two tubes or pipes together. Coupling the flange 6b of the flexible connection with the process flange 6a and tightening the compression fitting 8 onto the probe element 5, it is possible to ensure the gas tightness of the whole measuring device.

The materials selected for all these components may be chosen to the specific application requirements (in terms of temperature, pressure, type of process environment, etc.), affecting the performances of the proposed invention: maximum operating temperature, maximum allowable displacement, gas-tightness level, working life, etc. Nevertheless, it is the working principle that provides extended life to the probe or measuring insert, i.e. the flexibility in process connection.

Hence an assembly 10 or arrangement, based on a flexible process connection, to compensate differential deformation in high temperature containers or wherever thermal gradients are present between process connection and measuring environment is disclosed. Also the installation assembly can serve for receiving a probe element such as a thermowell, which itself can be independent from the kind of measuring insert or container. The assembly 10 and the arrangement respectively can comprise a flexible hose 3, coupled with a cardan joint 2, to limit the flexible hoses' 3 movement in the nozzle space in a tailored way. The assembly 10 and the arrangement respectively serves to protect in different ways protective tubes or measuring inserts and extend their working life.

The movement of the probe element 5 is depicted in FIG. 3 by arrows pointing upwards and downwards respectively. Of course a movement of the probe element 5 in the direction into and outward of the paper plane (and thereby superimposing the upward and/or downward displacement of the probe element 5) is also possible.

Typically there is a distance of 20-30 mm from the probe element to the surrounding walls inside the nozzle. Hence, this results in a maximum movement of about 3° (taken from the cardan joint to the tip of the probe element) which the installation assembly should be designed to allow, since a typical probe element 5, e.g. a thermowell or a measuring insert, is about 1 m long. Although other sizes can be chosen in accordance with the specific circumstances of the container, the container wall etc.

The invention claimed is:

1. An installation assembly with a probe element, structured to connect said probe element to a wall of a container, comprising:
a first mounting part and a second mounting part, wherein:
said first mounting part is structured to attach said installation assembly to said container wall and has a lead-through in which said probe element is inserted;
said second mounting part receives and fastens said probe element;
said first and second mounting part are flexibly connected to each other via a joint part;
said joint part comprises a flexible hose, one end of which is fixed to said first mounting part and a second end is fixed to said second mounting part;
that by way of the installation assembly said probe element is moveably attached to said container wall, wherein said probe element is allowed for angular movements with respect to said container wall;
said joint part comprises said flexible hose and a cardan joint connecting said first and said second mounting part;
said joint part forming said cardan joint comprises a ring, through which the probe element is insertable, said ring has a first and a second pair of axle stubs;
said first mounting part has two fork like arms that connect said first mounting part to said ring via a first pair if axle stubs; and
said second mounting part has two fork like arms that connect said second mounting part to said ring via a second pair of axle stubs.

2. The installation assembly according to claim 1, wherein:
said probe element is inserted into said flexible hose.

3. The installation assembly according to claim 1, wherein:
said hose is a corrugated tube made of metal.

4. The installation assembly according to claim 1, wherein:
said joint part comprises said flexible hose and a cardan joint connecting said first and said second mounting part.

5. The installation assembly according to claim 1, wherein:
said first mounting part and/or said second mounting part has at least one adjustable abutment, which limits the amplitude of the movement of said ring.

6. The installation assembly according to claim 1, wherein:
said second mounting part comprises a gas tight barrier.

7. The installation assembly according to claim 6, wherein:
the gas tight barrier is a compression fitting for sealing that seals a lead-through for of the probe element or a welding for sealing that seals a lead-through for of the probe element.

8. The installation assembly according to claim 1, wherein:

the installation assembly inserts the probe element into the container; and the probe element is one of:

a temperature sensor, a level sensor, a pressure sensor, and a flow sensor.

9. The installation assembly according to claim 1, wherein:

the installation assembly inserts the probe element into the container; and the probe element is a thermowell.

10. The installation assembly according to claim 1, wherein:

the probe element is a measuring insert which is inserted into a thermowell.

11. The installation assembly according to claim 1, wherein:

the installation assembly provides a gas-tight connection of the probe element to a process medium in the container.

12. An arrangement comprising an installation assembly and a probe element and a container according to claim 1.

* * * * *